UNITED STATES PATENT OFFICE.

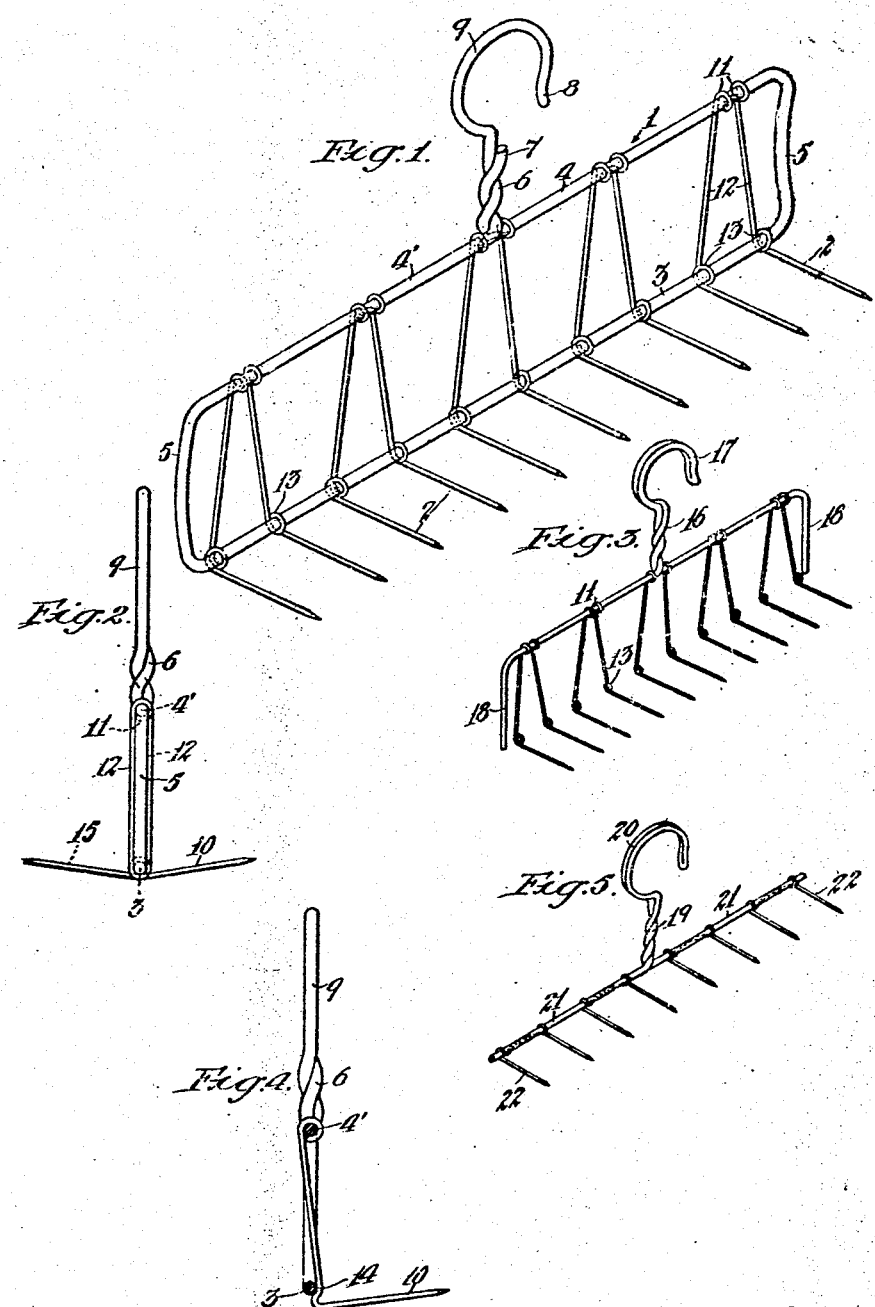

GEORGE L. STARK, OF HYDEPARK, AND ALBERT W. BAXTER, OF LOS ANGELES, CALIFORNIA.

SKEWER.

935,171.  Specification of Letters Patent.  Patented Sept. 28, 1909.

Application filed October 28, 1908. Serial No. 459,936.

*To all whom it may concern:*

Be it known that we, GEORGE L. STARK and ALBERT W. BAXTER, citizens of the United States, residing, respectively, at Hydepark and at Los Angeles, in the county of Los Angeles and State of California, have invented a new and useful Skewer, of which the following is a specification.

This invention relates to means for hanging meats and more particularly bellies of bacon, when being cured, and the principal object of the invention is to provide laterally yielding teeth or engaging means which are adapted to be automatically moved inward by the meat supported thereon as the meat gradually shrinks in being cured.

Another object is to form the teeth in pairs, as by bending the material from which each pair is formed at or near its middle and securing said bent portion to the main frame or supporting means of the skewer with the free ends projecting substantially parallel with each other in position for being engaged by the meat when the latter is being secured upon the skewer.

Another object is to provide a device which can be cheaply formed from material that will have the required strength and rigidity to cause it to retain its shape while in use, and also while it is being stored or handled as when it is removed from the meat and thrown out of the way until it is needed again.

Another object is to provide a device which will be as free as possible from creases or open spaces within which grease and pieces of meat would be liable to lodge and thereby become strong or rancid unless frequently cleaned out.

Other objects and advantages will appear as the construction and operation of the invention are hereinafter more fully disclosed.

In the accompanying drawings which illustrate different forms of the invention and which form a part of this specification, Figure 1 is a perspective view of one form of the invention. Fig. 2 is a vertical sectional view of a slightly different form of the invention showing the same adapted for supporting two pieces of meat instead of one. Fig. 3 is a perspective view of a form similar to that shown in Fig. 1 with the lower bar omitted. Fig. 4 is a vertical sectional view of another form, and Fig. 5 is a perspective view of another form of the device.

Referring more particularly to the drawings which are for illustrative purposes only and, therefore, are not drawn to any particular scale, 1 indicates the main frame or hanger portion of our skewer to which the prongs or teeth 2 are secured, as will be hereinafter more fully set forth. The frame 1 is preferably formed from one or more metallic rods or wires of sufficient size or diameter to secure the required strength and rigidity. In Fig. 1 the frame is preferably of an elongated rectangle having its lower bar 3 straight and uniform from end to end, as by being made from the central portion of the rod or wire. The upper part comprises two sections 4 and 4' formed from the intermediate portions of the wire upon opposite sides of the central portion 3 and extending inward from the end portions 5 substantially to the middle of the frame where they are twisted together in a spiral 6 with one of the ends, as 7, being shorter than the other and terminating at the upper end of the spiral while the other end 8 is extended beyond the spiral and formed into a hook or suitable suspending means 9. This form of frame secures great strength and rigidity with extreme simplicity of construction, and at the same time affords but few creases or places for the collection of grease and other foreign substances. The teeth or supporting pins 2 which we preferably use with this form of frame are formed from a piece of wire or other suitable material doubled up on itself substantially at its middle and having the doubled portion 11 wrapped around and secured to the upper cross-bar of the frame in any desired manner, preferably by dipping the same into melted material, as, for example, the material used for galvanizing purposes. The intermediate portion of each of the sides or arms 12 of the teeth is preferably provided with coils or spirals 13, one being shown, through which the lower bar 3 of the frame is adapted to be passed for holding the teeth in proper position, the free end of each tooth being preferably bent at an angle to the main portion 12 so as to project laterally from the frame 1. These coils fit loosely around the bar 3 so that when the meat that is suspended upon the hooks or pins shrinks from being cured the teeth or pins will gradually yield or spring inward toward the center of the skewer from both sides thereof, causing the sides or edges of the piece of meat to be substantially straight and uniform instead of being of the original width at the top and of a narrower width below, as is the case with the ordinary style of skewer or support. Instead of providing the sides of the teeth with a coil as above described, each of them can be provided with a slight bend or recess 14, as shown in Fig. 4, which will be adapted to engage with the bar 3 when the hooks or teeth occupy their normal positions, and especially when supporting a piece of meat.

Instead of having the teeth project only from one side, whereby the device is only adapted for suspending one piece of meat, the hooks or teeth can be extended from both sides, as shown in Fig. 2, indicated by the full lines 10 and the dotted lines 15. With this construction the teeth can be formed as shown in Figs. 1 and 4, or part of them can be formed one way, as by providing the coil and the other side can be provided with the bend or recess 14. Instead of using the lower bar 3, as above described, it may be omitted, as shown in Fig. 3, in which the wire is preferably doubled and twisted upon itself, as shown at 16, and formed into a hook 17 for suspending it and the ends 18 are extended down substantially into alinement with the coils 13 where they terminate. In this construction the teeth would preferably be made of heavier material to support the load without danger of its bending down the tips and slipping off, and the ends 18 of the frame would act as guards or protectors for the end teeth in case the skewer were thrown to one side and should happen to fall upon its end. But it is evident that the teeth would yield or approach each other toward the middle of the skewer from each end in the same manner as though the lower bar 3 were present.

Another form of device is shown in Fig. 5 in which the frame or supporting portion is formed from a piece of wire doubled and twisted upon itself at the center to form a spiral 19 and a hook 20 similar to the spiral 16 and hook 17 of Fig. 3, but the ends of the laterally extending ends 21 are not bent at an angle as in said Fig. 3. The hooks or teeth 22 for this form of skewer are substantially U-shaped with the bent portions partially or wholly wrapped tightly around the wires 21 and secured thereto, as by dipping in a suitable melted metal. In this form the teeth are rigidly secured at their inner ends to the wires and, therefore, are not yielding or movable toward the center of the skewer.

As will be noted from the forms of teeth shown in the drawings they are all formed in pairs with a double portion rigidly secured to the support or rectangular frame, and we consider our invention broad enough to cover either of the forms of such securement, as has been shown and described.

Where the teeth are formed so as to yield laterally, as in all of the figures except Fig. 5, the sides of the teeth from the doubled portion to the lower bar or to a point in alinement with the lower ends of the end pieces of the frames diverge from each other, as shown in Fig. 1, and are substantially parallel with each other at their tips, as in Figs. 3 and 4. We also consider that our invention is broad enough to include either form of the resilient or yielding teeth, that is to say, whether the inner portions diverge from each other in substantial W shape, or are parallel with each other in substantial U-shape.

As above described our improved skewer can be manufactured at but slight cost over the original cost of the material and will have great strength and adaptability for use wherever such devices are required. They are not liable to the accumulation of grease or foreign substance, and can be easily cleaned in the ordinary manner, whereby the risk of contamination from rancid or impure matter can be entirely avoided.

Having described our invention we claim:

1. In a skewer, a frame, teeth secured thereto, said teeth being formed in pairs each pair of teeth comprising a piece of material bent at its intermediate portion with its ends extending therefrom, said bent portion being rigidly secured to said frame, and a suspension hook on the frame at substantially right angles to the said extending ends of teeth.

2. In a meat skewer, a supporting frame, teeth rigidly secured thereto at one portion and having their ends extended substantially parallel with each other and in the same plane and movable laterally toward each other, and a suspension hook on the frame at substantially right angles to the said extending ends of teeth.

3. In a skewer, a supporting frame, teeth rigidly secured thereto at one portion and having their ends extending parallel with each other and in the same plane, the intermediate portion of each tooth being bent, the teeth being laterally movable toward the center of the frame from each end, and suspension means on the frame at substantially right angles to the said extending ends of teeth.

4. In a skewer, a substantially rectangular frame having one side provided with means for suspending it, teeth secured to said side and extending to and beyond the other side and bent around said latter side in position for slidably engaging therewith, the ends of said teeth extending parallel with each other and in the same plane and being movable toward the center of the frame from each end.

5. In a skewer, a frame having substantially parallel sides, teeth secured to one of said sides and extending across to the opposite side and being loosely bent around the latter side and capable of sliding thereon, the ends of said teeth projecting from the latter side and being substantially at right angles to the plane of said frame.

6. In a skewer, a frame having two sides, teeth secured to one of said sides and having slidable engagement with the other side, said teeth being formed in pairs, each pair of teeth being formed of a single piece of wire bent at the middle around the first named side of the frame and diverging from said point to the other side and being loosely coiled around the latter side, and the wires from the latter side extending substantially at right angles to the diverging portions of the wires.

In testimony whereof, we have hereunto set our hands at Los Angeles, California, this 21st day of October, 1908.

GEORGE L. STARK.
ALBERT W. BAXTER.

In presence of—
W. S. BOYD,
FRANK L. A. GRAHAM.